July 25, 1961 R. B. HALL 2,993,739

MAGNETOSTRICTIVE BEARING ASSEMBLY

Filed July 28, 1959

*INVENTOR.*
ROSS B. HALL

BY Roger W. Jensen

ATTORNEY

United States Patent Office 2,993,739
Patented July 25, 1961

2,993,739
MAGNETOSTRICTIVE BEARING ASSEMBLY
Ross B. Hall, St. Petersburg, Fla., assignor to Minneapolis-Honeywell Regulator Company, Minneapolis, Minn., a corporation of Delaware
Filed July 28, 1959, Ser. No. 830,104
8 Claims. (Cl. 308—1)

This invention pertains to a means of reducing bearing friction in control apparatus and more specifically pertains to a means of reducing bearing friction which includes as one of its primary components thereof one or more magnetostrictive elements and means for applying a magnetic field to said magnetostrictive element or elements. In one embodiment of the present invention a jewel and pivot bearing arrangement is provided for supporting one end of a sensitive instrument, the jewel being supported on a bearing support means and the pivot being connected to the sensitive instrument. The bearing support means includes three rod-like magnetostrictive elements each connected at one extremity thereof to the jewel means and more specifically being connected tangentially to said jewel element so that upon a change in length of the magnetostrictive rods the jewel will have a rotation imparted to it.

It is an object of this invention therefore, to provide an improved control apparatus.

Another object of the invention is to provide an improved means for reducing bearing friction, said means including one or more magnetostrictive elements.

Other objects of the invention will be set forth more generally in and become apparent from a reading of the following specification and appended claims in conjunction with the accompanying drawings in which:

Figure 1:
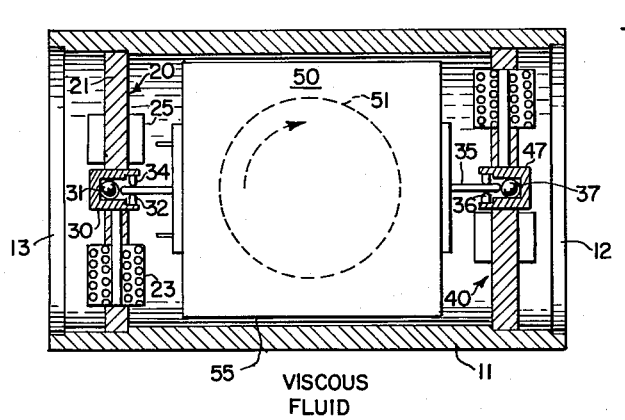
FIGURE 1 is the cross sectional view of a sensitive instrument which includes the improved bearings constituting the present invention.

Referring to FIGURE 1, reference numeral 10 generally depicts a sensitive instrument of the floated gyro type comprising an outer housing or base or support means 11, having a generally hollow cylindrical configuration being closed off at each end by end caps 12 and 13. A pair of bearing support means 20 and 40 are positioned within the housing 10, at opposite ends thereof and serve to support for rotation relative to the base or housing 11, a chamber or gimbal assembly 50, which in turn contains a gyroscope which is schematically represented by a wheel or rotor 51, adapted to rotate about a spin reference axis which, as shown in FIGURE 1, is perpendicular to the plane of the paper.

A viscous fluid 55, is provided within the housing 10, and surrounds the gimbal assembly 50. The viscous fluid 55 for a floated instrument has a density selected to match the average density of the gimbal so that the gimbal will be buoyed up in substantial neutral suspension.

Figure 2:
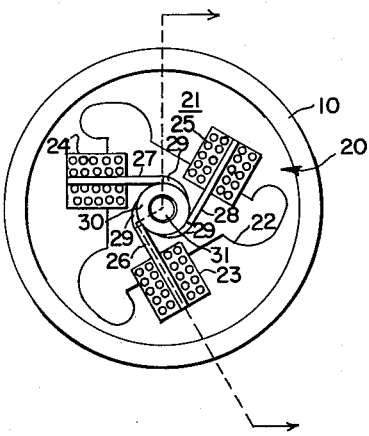
FIGURE 2, is a cross sectional view of one of the bearing support means shown in FIGURE 1.

The bearing support means 20 and 40, are generally similar to one another with certain exceptions to be noted below. Bearing support means 20 includes a frame portion 21 which as shown in FIGURE 2, has a circular outer periphery selected so that it may be fitted within the housing 11 and is adapted to be secured thereto by suitable means not shown. A generally triangularly shaped opening 22, is provided in the frame 21. Three coil elements 23, 24, and 25 are positioned on frame 21 around the three sides of the opening 22. A magnetostrictive rod element is centrally positioned within each of the coils. The rod elements are identified by reference numerals 26, 27, and 28 and are respectively associated with coils 23, 24, and 25. One end of each of the rod elements is abutted against the frame 21 and the other extremity or end of each rod is solidly connected by suitable means to offset portions 29 of a jewel bearing retainer or holder 30. With the arrangement thus far described, the jewel bearing holder 30 is centrally positioned within the opening 22 of the frame 21 by the magnetostrictive rod elements 26, 27, and 28. It will be understood that the rod elements are generally tangentially connected to the holder 30 so that when the rod elements simultaneously change length in the same sense there is a relative rotation produced between the bearing holder 30 and the housing 10.

The jewel bearing holder 30 as shown in FIGURE 1, has a pair of concentric cylindrical bores or recesses therein, with spherically shaped thrust bearing element 31 positioned in the smaller of the recesses and with a suitable jewel bearing 32 positioned and secured within the larger of the recesses. A pivot element 34 is centrally positioned on one end of the gimbal assembly 50, and extends into the recess of the bearing holder 30, extending through the central aperture in the jewel bearing 32 and having a rounded extremity which abuts against the spherically shaped thrust element 31.

Figure 3:
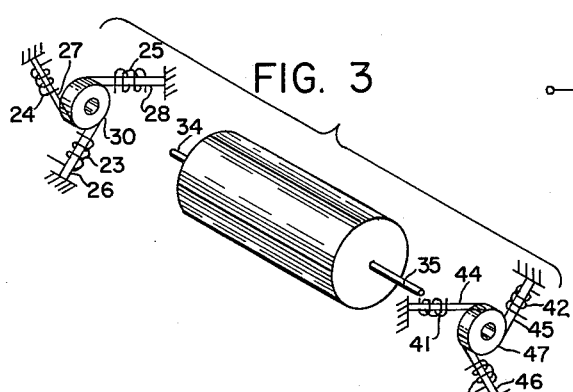
FIGURE 3, is an exploded somewhat schematic view of the apparatus shown in FIGURES 1 and 2.

As indicated, the bearing support means 40 is generally similar to bearing support means 20. It includes a frame element upon which are mounted three coil means 41, 42, and 43 adapted to co-act respectively with three magnetostrictive rod elements 44, 45, and 46. A jewel holder member 47 is positioned centrally by the rod elements 44—46 similar to the support of jewel holder member 30. A second gimbal pivot 35, is adapted to co-act with a jewel bearing 36 and a spherically shaped thrust bearing element 37 positioned within the bearing holder 47. Referring to FIGURE 3, it will be noticed that the rod elements 44—46 are connected between their frame element and bearing holder 47 in the reverse sense from that of the rod elements 26—28 and their bearing holder 30. This provides one method by which the relative rotation between a cooperating jewel and pivot at one end of the gimbal assembly is opposite to the relative rotation between the pivot and jewel on the other end of the gimbal assembly.

A detailed discussion of magnetostrictive elements will not be presented here, it being generally understood by those skilled in the art that a magnetostrictive element is one which when subjected to a change in applied magnetic field will change in length. Some materials will increase in length for an increasing field, some will decrease in length for an increasing field, while other materials will first increase and later decrease in length as the intensity of the magnetic field is increased. The scope of the present invention should be understood to include all combinations of magnetostrictive elements to the extent that they may be utilized as described herein.

Figure 4:
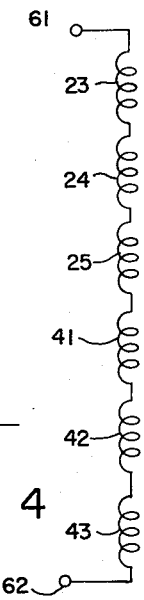
FIGURE 4, is a schematic wiring diagram showing the interconnection between the coil means which are associated with the magnetostrictive rod elements.

FIGURE 4, schematically represents one way of connecting together the coils 23—25 and 41—43. As depicted, all of said coils are connected in series arrangement by suitable connection means terminating at a pair of connections or terminals 61 and 62 to which may be applied a suitable energization such as a square wave excitation identified by reference numeral 63.

Operation

When the coils 23—25 and 41—43 are energized by a varying excitation such as the square wave excitation 63, it will be understood that said coils will produce a changing magnetic field for the rod elements 26—28 and 44—46. For purposes of this discussion it may be assumed that the rod elements are characterized by the property of increasing in length for an increasing magnetic field. Assuming that the magnitude of current to the coils associated with the rod elements is increasing so as to produce an increasing magnetic field, then the rod elements will all tend to increase in length a slight amount. This will produce as shown in FIGURE 3, a counterclockwise movement of the bearing holder 30 and a clockwise rotation of the bearing holder 47 and accordingly will impart the same relative rotation to the jewel bearings 32 and 36, i.e. bearing 32 counterclockwise and bearing 36 clockwise. When the energization to the coils begins to decrease, then the rod elements tend to return to their initial condition which will in turn tend to bring the jewel bearings 32 and 36 back to their initial position. It will be understood that by having an alternating excitation to the coils that there will be an oscillation between the jewels 32 and 36 and their co-acting pivots 34 and 35 respectively. Due to the reverse arrangement of the rods 44—46 as compared to rods 26—28, the tendency of the oscillating jewels 32 and 36 to impart torques to the gimbal 50 is nullified. To explain, the instantaneous torque applied to the gimbal by the bearing 32 is opposed by the instantaneous torque from the bearing 36. This is important since a resultant or net torque applied to the gimbal 50 would be undesirable. The oscillation of the jewels 32 and 36 in combination with the viscous fluid 55 produces hydraulic centering forces on the pivots 34 and 35 which is advantageous since it results in reducing the uncertainties of the sensitive instrument. For floated gyros or for other floated instruments such as floated accelerometers, the hydraulic centering forces, in effect, reduce the friction between the co-acting jewels and pivots to reduce the uncertainty of the instrument.

It will be understood that the invention may be practiced with bearings having other types of lubrication and that it is not limited to sensitive instruments of the floated type.

While I have shown and described a specific embodiment of this invention, further modifications and improvements will occur to those skilled in the art. I desire to be understood, therefore, that this invention is not limited to the particular form shown and I intend in the appended claims to cover all modifications which do not depart from the spirit and scope of this invention.

What I claim is:

1. In a sensitive instrument: a housing; a pair of spaced apart bearing support means mounted on said housing; a first bearing element connected to each of said bearing support means and defining an axis; a member in said housing; second bearing elements on said member coacting with said first bearing elements so that said member is pivotally journalled; a plurality of magnetostrictive rod elements included in each of said bearing support means; and means including said rod elements for oscillating said bearing elements relative to each other, the coacting bearing elements associated with one of said bearing supports being oscillated out of phase with the coacting bearing elements associated with the other of said bearing supports.

2. In apparatus of the class described: a base member; a supported member; means mounting said support member on said base member for relative rotation therewith including two sets of coacting bearings and pivots, said bearings being connected to one of said members and said pivots being connected to the other of said members; and means for oscillating said pivots and bearings relative to one another including magneotstrictive means connected to said bearings and means for applying a variable magnetic field to said magnetostrictive means.

3. In apparatus of the class described: a base member; a supported member; means mounting said supported member on said base member for relative rotation therewith including bearing means and means engaging said bearing means; and means for producing relative oscillation between said bearing means and said engaging means including magnetostrictive means and means for applying a variable magnetic field to said magnetostrictive means.

4. In apparatus of the class described: a base member; a supported member; means mounting said supported member on said base member for relative rotation therewith including bearing means and means engaging said bearing means; and means for producing relative oscillation between said bearing means and said engaging means including magnetostrictive means.

5. In apparatus of the class described: a bearing element; a pivot element positioned on said bearing element; a support; and means for oscillating said elements with respect to each other comprising a plurality of magnetostrictive rods connected between said support and one of said elements, coil means inductively coupled with said rod means, and means for energizing said coil means.

6. In apparatus of the class described: a first bearing element; a second bearing element coacting with said first bearing element; and means for oscillating said elements bearing element; and means for oscillating said elements with respect to each other comprising magnetostrictive means connected to one of said elements.

7. In apparatus of the class described: a bearing element; a pivot element positioned to coact with said bearing element; a support; and means for oscillating said elements with respect to each other comprising magnetostrictive means connected between said support and one of said elements and means for applying a magnetic field to said magnetostrictive means.

8. In apparatus of the class described: a bearing element; a pivot element journalled on said bearing element for relative rotation therewith about an axis; a support; and means for oscillating said elements with respect to each other about said axis comprising magnetostrictive means connected between said support and one of said elements, and means for applying a magnetic field to said magnetostrictive means.

References Cited in the file of this patent

UNITED STATES PATENTS

| | | |
|---|---|---|
| 1,386,029 | Rossiter | Aug. 2, 1921 |
| 1,452,485 | Tanner | Apr. 17, 1923 |
| 2,859,626 | Maze | Nov. 11, 1958 |